May 24, 1960 G. BECKMAN ET AL Re. 24,828
METALLIC SURFACED INSULATING STRUCTURAL MATERIALS FOR SIDING AND ROOFING
Original Filed April 15, 1954 2 Sheets-Sheet 1
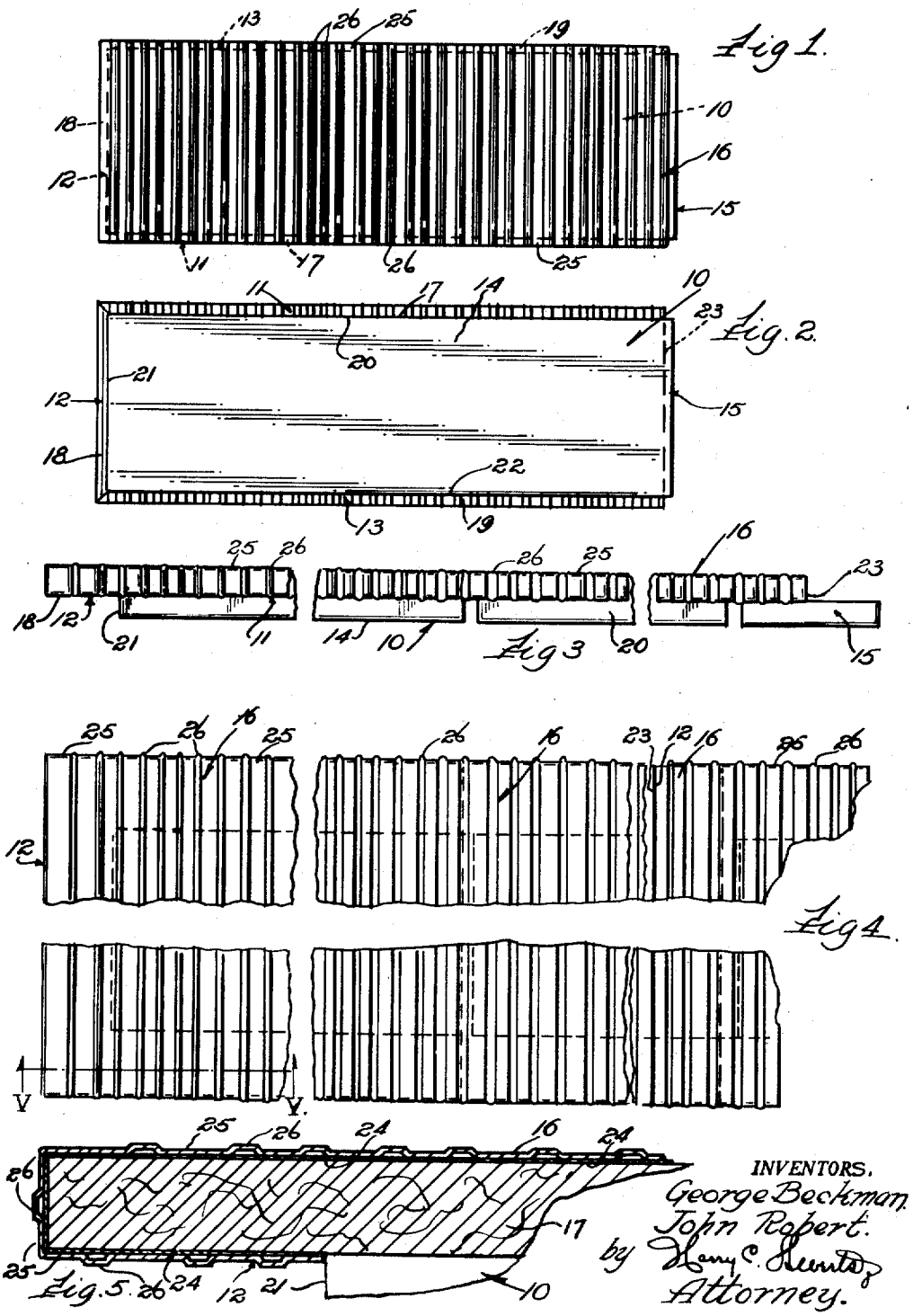
INVENTORS.
George Beckman
John Robert.
by Henry C. Hunter
Attorney.

METALLIC SURFACED INSULATING STRUCTURAL MATERIALS FOR SIDING AND ROOFING

Original Filed April 15, 1954 2 Sheets-Sheet 2

INVENTORS.
George Beckman
John Robert.
by Harry C. Leonard
Attorney.

United States Patent Office

Re. 24,828
Reissued May 24, 1960

24,828

METALLIC SURFACED INSULATING STRUCTURAL MATERIALS FOR SIDING AND ROOFING

George Beckman, Lowell, Ind., and John Robert, Chicago, Ill., assignors to Globe Siding Products Company, Whiting, Ind., a corporation of Delaware Original No. 2,856,647, dated Oct. 21, 1958, Ser. No. 426,092, Apr. 15, 1954. Application for reissue Mar. 17, 1959, Ser. No. 859,826

2 Claims. (Cl. 20—5)

Matter enclosed in heavy brackets [ ] appears in the original patent but forms no part of this reissue specification; matter printed in italics indicates the additions made by reissue.

This invention relates to composite sheets or rolls of metallic reflective and insulating materials having a high resistance to conduction so that their combination will enhance the qualities of the individual materials and render them more suitable for exterior building purposes during all seasons of the year, although certain features thereof may be used with equal advantage for other purposes.

It contemplates more especially an improved composite structural material comprising highly reflective metallic materials such as but not limited to light-gauge aluminum of foil gauge of .006" or less which is corrugated, grained or textured for strength and appearance for improved application to thermally non-conductive material so that the products resulting from their association can be used with increased efficiency and advantage for structural and/or decorative purposes.

It is generally known that thin sheets of bright metallic materials such as aluminum have a high thermally reflective characteristic, but such materials do not resist conduction or transmission of heat or cold and are readily deformed by impact therewith. The combination of thin metallic sheets such as aluminum that is preferably corrugated for strength and appearance with a sheet material that has insulating properties and resists conduction as well as transmission of heat or cold, constitutes a desirable combination for roof sheeting, building siding and underflooring where there are no basements and moisture-laden cold air has ready access.

Furthermore, metallic sheeting such as aluminum even in a thin gauge of foil thickness of .006" or less possesses the desired tensile strength and the thermally reflective properties which combine with the insulating properties of asphaltum sheet materials, such as saturated felt or saturated insulating board, plywood, and pressboard, to give protective body thereto and resist the thermal transmission and conduction of heat and cold. The lamination of such sheets of material in the continuity of production operations is comparatively difficult because of the substantial differences in their tensile strength, coefficient of expansion and contraction and their respective resistances to bending and deformation; however, this problem has been solved by special flanged connection therebetween to compensate therefor.

Resort to an adhesive alone to retain these different sheets in laminated association is not considered entirely satisfactory, so that the problem has been solved by flanging the metallic sheet around the edges of saturated felt or building siding so that a permanently tacky adhesive can be utilized to preclude the creasing or rupture of the highly flexible sheeting materials. Then, too, it is preferable though not essential, to corrugate, grain or texture the metallic sheets to increase their rigidity, compensate for expansion and contraction and to provide an impressive surface design. To accomplish the lamination of such sheeting material in the continuity of production operations has required special processing and mechanical expediency in view of the delicate nature of these materials from the standpoint of their differences in tensile strength, coefficient of expansion and contraction and their delicate character from the standpoint of possessing little or no resistance to deformation while the sheets are under processing for association with each other.

It should be observed that uncorrugated or plain aluminum hollow siding has heretofore been proposed and used; however, such siding materials have no substantial insulating value, rattle while being subjected to winds and storms, deform on impact or pressure, are not air-proof or wind-proof, and cannot be striated because their substantial thickness of .024" or more will crack through upon being corrugated, and such siding materials are not sufficiently stiff for practical purposes. It is also necessary to use accessories for locking shingles or siding of this type or structure in place, and it would be difficult if not impossible to use metallic sheets of foil thickness which is .004" or less and a maximum of .006" or even somewhat thicker gauge which can be striated for strength and appearance and adapt themselves for utilization and association with shiplapped impregnated insulating board or plain laminated impregnated sheets of heavy felt or laminated saturated sheets of roofing felt.

These materials besides being in flanged association may be caused to adhere over the entire contacting area for further protection by resort to an extra coating such as bitumen, resin, asphalt, pitches, or other adhesives which preferably have a permanently tacky consistency. With the teachings of the present invention, the metallic foil sheet such as aluminum of substantially .005" thickness (plus or minus) can be striated for strength and effectively flanged to a shiplap insulating board which is covered therewith on three sides and has a plain covered edge on the fourth side to compensate for expansion and contraction. Then, too, such thin metallic foil materials can be flanged over the butt-ends of insulating materials such as laminated sheets of asphaltum impregnated felt, plywood, or pressboard, and these materials shaped to serve as effective siding and/or roofing materials.

One object of the present invention is to provide an improved composite sheet of metallic and insulating material for building structural purposes.

Another object is to provide an improved corrugated metallic sheet of thin material having a highly reflective surface for association with a thermally non-conductive material such as asphaltum impregnated sheets or insulating board that will resist heat penetration in summer and cold in winter.

Still another object is to provide improved shiplap aluminum corrugated composite materials that are in flanged association to retain an asphaltum insulating material therewith for use as an external building roofing or siding sheet and/or both or for interior walls and decorative effects depending upon their structural details which control their application.

A further object is to provide a plain or striated painted or upainted metallic material in flanged association with an insulating board to provide a composite building material for application to roofs, siding, or other portions of building structures where appearance, insulating qualities, and moisture barriers are important considerations.

A still further object is to provide a composite sheet of plain or striated aluminum preferably of foil thickness in flanged association with asphaltum impregnated insulating material to serve as a thermal and moisture barrier in conjunction with the reflective metallic surfacing material which also is corrosion resistant.

Still a further object is to provide an improved composite building material consisting of a plain or striated metallic foil in improved flanged association with an insulating board or laminated sheets to provide a more efficient exterior building material having improved appearance qualities, and is more durable and weather resisting.

Other objects and advantages will appear from the following description of an illustrated embodiment of the present invention.

In the drawings:

Figure 1 is a plan view of a shiplapped composite panel embodying features of the present invention.

Figure 2 is a plan view of the underside or opposite surface of the panel shown in Figure 1.

Figure 3 is an edge view in elevation of the panel shown in Figures 1 and 2.

Figure 4 is an enlarged fragmentary plan view of several panels of the type illustrated in Figures 1 to 3 inclusive in complemental association.

Figure 5 is a fragmentary sectional view in elevation taken substantially along line V—V of Figure 4.

Figure 6:
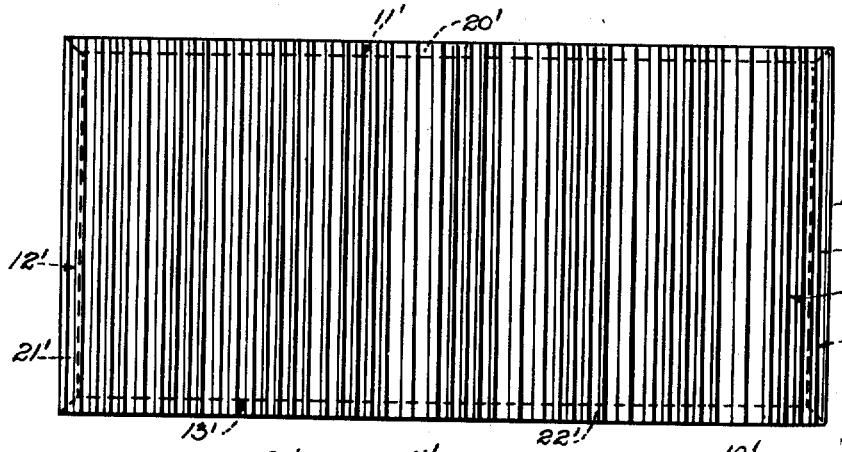
Figure 6 is a plan view of a modified butt-end composite sheet consisting of striated metallic foil in flanged association with two or more laminated sheets of asphaltum impregnated felt.
Figure 7:
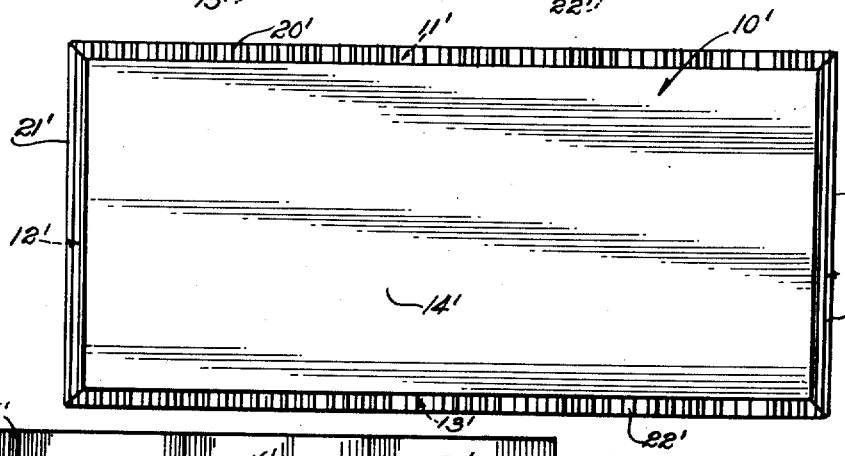
Figure 7 is a plan view of the underside or opposite surface of the panel shown in Figure 6.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a substantially rectangular sheet of insulating board 10 which is a standard product on the market and is preferably though not essentially impregnated with asphaltum compounds to render such resistant to moisture and to increase the rigidity thereof. The substantially rectangular sheet 10 prior to impregnation is preferably though not essentially shiplapped to provide, in this instance, three edges of shiplap construction 11—12—13.

In the present embodiment the three contiguous edges 11—12—13 face in one direction, namely toward the back surface 14 and the remaining shiplapped end 15 faces the front to serve as a complement of the opposite shiplapped edge 12 on the adjacent insulating board 10. It should be noted that the shiplapped end 15 faces the front panel of the board 10 opposite to the back surface 14 thereof so that the insulating board 10 can be reversed in position with each lateral tier or course to provide interfitting complemental association with the oppositely disposed shiplapped end 12. This will provide the contiguous joinder of lateral courses with interfitting joints that are resistant to climatic conditions. The impregnation of the shiplapped insulating board 10 renders such resistant to moisture and thermally non-conductive of heat and cold, but such structural materials are not effectively resistant to surface defects by abrasion, impact, and climatic erosion.

Furthermore, such materials do not reflect the sun's rays which are responsible for a substantial part of the thermal radiation during the high heat of the summer months and to overcome this as well as to provide a more substantial exterior surface with improved appearance characteristics, a thin metallic material 16 in physical association with the insulating board 10 results in a composite building material having improved thermal characteristics, wearing qualities, and an attractive appearance. The metallic surfacing materials 16 for economic and production considerations should be preferably of foil thickness which is anywhere up to .006″ (plus or minus) and this material is preferably though not essentially of aluminum that has high reflective properties.

Foil sheet material of this thinness can be striated or corrugated to increase the rigidity thereof and to provide an attractive surface design as well as compensate for expansion and contraction in the composite structural material. To this end, the thin metallic sheet material 16 within the thickness prescribed by way of illustration rather than limitation, consists of a sheet 16 that is sufficiently wider and longer than the substantially rectangular insulating board 10 of comparatively much greater thickness including its shiplapped edges 11—12—13—15 to provide an underlap 17—18—19 that are folded around and over the shiplaps 11—12—13 for flanged association therewith. The aluminum fold-over flanges cover the underside of the shiplap 17—18—19 up to the peripheral shoulder 20—21—22 defined by the shiplapped edges 11—12—13 with the full thickness of the board 10. A suitable normally tacky adhesive 24 known in the building industry may be interposed between the adjacent surface of the metallic sheeting 16 and the board 10, and should commercial practice so dictate, this may also be applied to the flanged underlaps 17—18—19 and edge lap 23.

The shiplapped end 15 which faces the front panel of the board 10 (Figures 1 and 3) has the aluminum overlap extending down along the peripheral shoulder 23 formed by the shiplap 15 with the full thickness of the board 10, but at this end the end overlap 23 extends downwardly to the shiplapped edge 15 and not thereover, thereby enabling the foil sheet material 16 and the insulating board 10 to compensate for the variations in expansion and contraction since there is a substantial difference in the coefficient of expansion and contraction between these substantially different materials. It should be observed that this permits the shiplap end 15 to be fully exposed and uncovered in the direction of the front panel 10, and it will serve as a complement of the shiplap 12 on the opposite end of the next adjacent panel 10 of aluminum covered insulating board so that a double thickness of aluminum will not be interposed between laterally adjacent sheets of insulating board 10.

The aluminum covered insulating board 10 when shiplapped as illustrated and described herein, is used for lap siding of superposed courses, and these are held in position by nails which are applied through the composite sheets 10—16 of aluminum covered insulating board 10 in the area of the overlap of the next superimposed course for complete concealment and protection against the weather. The insulating board 10 is preferably first impregnated with a substantial film of asphaltum or other asphaltic compounds prior to the application of the aluminum sheet 16 thereof in the manner described supra. To insure a better association between the aluminum sheet 16 and the insulating board 10, it may also be desirable to provide a normally sticky adhesive 24 to the surfaces that come in contact with the aluminum 16, and this adhesive will tend to improve the thermal [*qualities*] of the composite sheet 10—16 as well as effect a more permanent joinder between the aluminum sheet 16 therewith.

It is also desirable and preferable to corrugate or striate the aluminum sheet 16 prior to its application to the insulating board 10, and to this end a series of parallel corrugations preferably though not essentially vertical, although such could be horizontally or diagonally disposed, are rolled or otherwise provided therein to present valleys 25 and nodes 26. The valleys 25 and nodes 26 are striated with any desired spacing relative to each other depending upon the considerations of the appearance desired thereof and the dictates of commercial practice as to the reinforcing qualities to be imparted thereto. As shown, the nodes 26 are, in this instance, non-uniformly spaced in a particular pattern relative to the valleys 25 therebetween, and the latter may comprise the plane of the sheet 16 for contact with the surface of the insulating board 10. The plane of the sheet 16 comprising the valleys 25 of the striations 25—26 will be in contact with the insulating board 10. The striations 25—26 will create a particular visual impression, but by reversing the sheet 16 so that the corrugations or striations 26 will be in contact with the surface of the insulating board 10, a different visual effect and design will be produced owing to the variations in spread or spacing as between the valleys and nodes 25—26.

This may prove advantageous, and the selection of the pattern as well as the closeness of the nodes 26 depends upon the dictates of commercial practice to provide a composite sheet that is durable, solid, and will withstand variations in wind pressures and impact without any noise factor. It should also be noted that the nodes 26 of the corrugations 25—26 provide an air space which will allow any excess adhesive 24 to occupy the space provided therebeneath should elevated temperatures cause an increase in volume thereof. Then, too, it may be desirable depending upon the experience and dictates of commercial practice to provide an excessive thickness of adhesive film 24 so that the space beneath the nodes 26 of the corrugations 25—26 will be filled therewith to provide a solid backing therefor and to preclude deformation by impact or external load thereon.

With this arrangement and construction, it will be apparent that applicants have provided improved insulated siding or shingle composite materials which will be highly reflective to the sun's rays and will resist the radiation and transmission of heat or cold therethrough. The aluminum covering panel 16 may be painted with bright colors of any desired choice should commercial practice so dictate, since bright colors are known to be almost as reflective to the sun's rays as natural aluminum. The corrugations in the metal foil panels 16 impart a pleasing appearance and design to the surface of the siding and shingles, increase the rigidity thereof, minimize deformation and totally eliminate the noise factor due to winds and other external influences. The provision of a plain fold-over edge 23 on one lateral end of the shiplapped board 10 together with the striations or corrugations 25—26 compensate for variations in expansion and contraction between the two composite materials 10—16, and a much more durable composite structural material results by resort to the teachings of the present invention.

Figure 10:
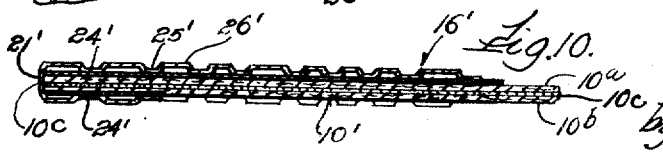
Figure 10 is an enlarged fragmentary sectional view taken substantially along line X—X of Figure 9.

In the modified embodiment illustrated in Figures 6 to 10 inclusive, the shiplapped construction of the board 10 is dispensed with, and either a butt- or square-edged insulating board 10′ is provided. In the specific embodiment illustrated herein, multiple layers of dry or impregnated heavy felt 10a—10b are utilized (Figure 10). With the use of laminated asphaltic impregnated felt 10a—10b, in this instance two layers, are preferably though not essentially of 50-gauge, or dry felt may be adhered together with asphaltic, plastic, or petroleum resin or pitches which are normally tacky to provide an adhering film 10c therebetween. The film laminations 10a—10b are preferably flexible for use either as siding or roofing, and are covered with panels 16′ of aluminum foil which is first striated or corrugated to provide valleys 25′ and nodes 26′ of the same or opposite spacing as that shown in the previous embodiment.

Figure 8:
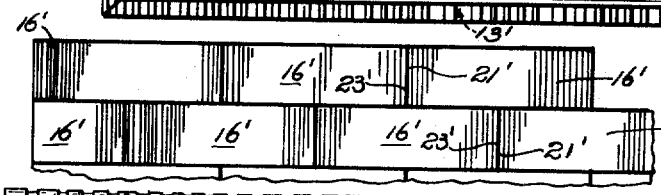
Figure 8 is an enlarged fragmentary plan view of several panels of the type illustrated in Figures 6 and 7 in complemental association.
Figure 9:
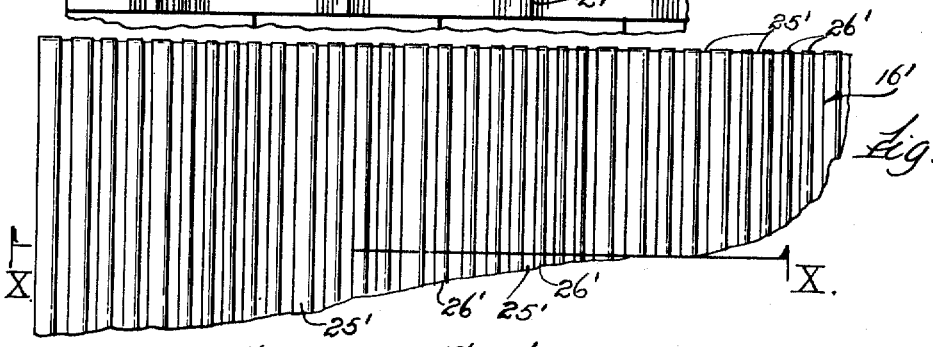
Figure 9 is a fragmentary enlarged plan view of the striated surface of the composite sheet shown in Figures 6 to 8 inclusive and illustrating the upraised portions of the striated surfaces opposite to those shown in Figures 1 to 5 inclusive to give a different visional striated effect.

The sheet 16′ is preferably larger than the rectangular expanse of the laminated insulating base 10′ so that the edges 20′—21′—22′—23′ thereof can be folded over and under the insulating board 10′ to provide flanged underlaps which are mitered at their corners to completely enclose the top surface thereof and the edges 11′—12′—13′—15′ to expose the back surface 14′ thereof except in the region of the flanged underlaps 20′—21′—22′—23′. The metallic foil 16′ is preferably in adhering contact with the base consisting, in this instance, of the laminated sheets of felt 10a—10b by resort to a film of petroleum pitch, resin, or plastic normally tacky adhesives 24′ which are well known in the insulating siding and roofing industry. Should commercial practice so dictate, the flanged underlaps 20′—21′—22′—23′ may also be in adhering contact by resort to the tacky adhesive film 24′; however, this may involve some production problems and with this arrangement, the butt- or square-edged composite sheets 10′—16′ are applied as lap siding with alternate meeting joints in brick formation as illustrated in Figure 8. With this type of siding, a vertical joint strip known in the trade as a Bakerstrip is nailed to the building structure beneath the joint to eliminate rain and moisture leakage.

These painted or unpainted composite sheets 10′—16′ are attached with nails that are concealed by the lap in the superimposed course or attached by resort to clips in the same manner as locked-down roofing and siding. The improved feature is the provision of ornamented metallic surfaces which have striations or corrugations therein to compensate for the variations in expansion and contraction between the two materials and to rigidify normally flexible and comparatively thin laminations of dry or saturated felt 10a—10b with or without adhering films of adhesives such as petroleum pitch, resins, and plastics known in the industry and utilized for other purposes. The highly advantageous properties of metallic foil with those of insulating materials, have been combined into composite structural materials that have enhanced wearing properties, improved thermal characteristics, better and more permanent exposed surfaces, and can be produced with necessary limits of expense to meet the demands for such an improved composite building structural material.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. A building board, comprising an elongated substantially rectangular relatively thick [fibrous] foundation board, said foundation board having four edges with generally half-thickness half-lap edge portions therealong, three of said four half-thickness edge portions being at the front of said foundation board, the fourth of said half-thickness edge portions being at the rear of said foundation board and along the shorter dimension thereof, said fourth half-thickness edge portion defining an inset laterally facing shoulder extending along the front of said foundation board at the base of said fourth half-thickness edge portion, and a continuous relatively thin metal sheet covering the front of said [fibrous] foundation board with adhesive material therebetween, said metal sheet having a plurality of corrugations formed therein and extending transversely to the longer dimension of said foundation board, said metal sheet having three underturned edge flanges extending therefrom around and under said three half-thickness edge portions at the front of said foundation board, said metal sheet having a fourth edge flange turned downwardly and covering said shoulder, said fourth edge flange terminating substantially at the base of said fourth half-thickness edge portion.

2. A building board, comprising an elongated substantially rectangular relatively thick [fibrous] foundation board, said foundation board having four edges with generally half-thickness half-lap edge portions thereaong, three of said four half-thickness edge portions being at the front of said foundation board, the fourth of said half-thickness edge portions being at the rear of said foundation board, said fourth half-thickness edge portion defining an inset laterally facing shoulder extending along the front of said foundation board at the base of said fourth half-thickness edge portion, and a continuous relatively thin metal sheet covering the front of said [fibrous] foundation board, said metal sheet having three underturned edge flanges extending therefrom around and under said three half-thickness edge portions at the front of said foundation board, said metal sheet having a fourth edge flange turned downwardly and covering said shoulder, said fourth edge flange terminating substantially at the base of said fourth half-thickness edge portion.

References Cited in the file of this patent or the original patent

UNITED STATES PATENTS

| | | |
|---|---|---|
| 113,882 | Hickcox | Apr. 18, 1871 |
| 192,400 | Worthen | June 26, 1877 |
| 1,659,539 | Judson | Feb. 14, 1928 |
| 1,864,055 | Finkeldey | June 21, 1932 |
| 2,264,961 | Ward | Dec. 22, 1941 |
| 2,382,234 | Koch | Aug. 14, 1945 |
| 2,592,244 | Chamberlain | Apr. 8, 1952 |
| 2,718,674 | Hinds | Sept. 27, 1955 |
| 2,731,375 | Toulmin | Jan. 17, 1956 |